United States Patent [19]

Ciric

[11] 4,021,331

[45] May 3, 1977

[54] ORGANIC COMPOUND CONVERSION BY ZEOLITE ZSM-20 CATALYSTS

[75] Inventor: Julius Ciric, Pitman, N.J.

[73] Assignee: Mobil Oil Corporation, New York, N.Y.

[22] Filed: May 25, 1976

[21] Appl. No.: 689,719

Related U.S. Application Data

[62] Division of Ser. No. 526,883, Nov. 25, 1974, Pat. No. 3,972,983.

[52] U.S. Cl. .............................. 208/111; 208/120; 260/673; 260/673.5; 260/683.15 E
[51] Int. Cl.² .................. C10G 13/04; B01J 29/28
[58] Field of Search ........... 208/111, 120; 260/673, 260/673.5, 683.15

[56] References Cited

UNITED STATES PATENTS

| | | | |
|---|---|---|---|
| 3,130,007 | 4/1964 | Breck | 423/328 |
| 3,306,922 | 2/1967 | Barrer et al. | 260/448 C |
| 3,308,069 | 3/1967 | Wadlinger et al. | 252/455 Z |
| 3,702,886 | 11/1972 | Argauer et al. | 423/328 |
| 3,760,024 | 9/1973 | Cattanach | 260/673 |

Primary Examiner—Delbert E. Gantz
Assistant Examiner—G. E. Schmitkons
Attorney, Agent, or Firm—Charles A. Huggett; Raymond W. Barclay; Dennis P. Santini

[57] ABSTRACT

Catalytic conversion of organic compounds in the presence of a crystalline zeolite, designated ZSM-20, is provided. Zeolite ZSM-20 has a composition expressed in terms of mole ratios of oxides in the anhydrous state as follows:

$$(0.3 - 0.6)R_2O : (0.4 - 0.7)M_2O : Al_2O_3 : (x)SiO_2$$

wherein R is a tetraethylammonium cation, M is an alkali metal cation and x is at least 7, and is characterized by a specified X-ray powder diffraction pattern.

19 Claims, No Drawings

ORGANIC COMPOUND CONVERSION BY ZEOLITE ZSM-20 CATALYSTS

CROSS-REFERENCE TO RELATED APPLICATION

This is a division of application Ser. No. 526,883, filed Nov. 25, 1974, now U.S. Pat. No. 3,972,983.

BACKGROUND OF THE INVENTION

1. Field of the Invention

This invention relates to catalytic conversion of organic compounds, e.g. hydrocarbons, in the presence of a catalytic amount of zeolite ZSM-20 or the thermally treated product thereof.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as (Ca/2), (Sr/2), Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designed by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752) and zeolite ZSM-5 (U.S. Pat. No. 3,702,886), merely to name a few.

A crystalline aluminosilicate zeolite well known in the art is faujasite. The ZSM-20 zeolite for use in the present invention resembles faujasite in certain aspects of structure, but has a notably higher silica/alumina ratio than faujasite.

SUMMARY OF THE INVENTION

The present invention relates to the use of a novel synthetic crystalline aluminosilicate, hereinafter designated "zeolite ZSM-20" or simply "ZSM-20", or the thermally treated product thereof for organic compound, e.g. hydrocarbon compound, conversion. The ZSM-20 composition has a characteristic X-ray diffraction pattern, the values of which are set forth in Table 1, hereinafter. The ZSM-20 composition can also be identified, in terms of mole ratios of oxides in the anhydrous state, as follows:

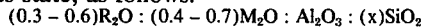
$(0.3 - 0.6)R_2O : (0.4 - 0.7)M_2O : Al_2O_3 : (x)SiO_2$ wherein R is a tetraethylammonium cation, M is an alkali metal cation and x is at least 7.

In the as synthesized form, the zeolite has a formula, in terms of mole ratios of oxides and in the anhydrous state, as follows:

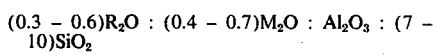
$(0.3 - 0.6)R_2O : (0.4 - 0.7)M_2O : Al_2O_3 : (7 - 10)SiO_2$ wherein R is a tetraethylammonium cation and M is an alkali metal cation, especially sodium.

Also, the zeolite ZSM-20 crystal structure is comprised of relatively uniform rigid three-dimensional pore networks charcterized by uniform pores of between 7 and 8 Angstrom units in diameter.

The original cations of the as synthesized ZSM-20 for use herein can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically-active, especially for hydrocarbon conversion. These include hydrogen, hydrogen precursors (e.g. ammonium ions), rare earth metals, aluminum, metals of Groups IB, IIB, IIIB, IVB, VIB, IIA, IIIA, IVA and VIII of the Periodic Table of Elements.

The synthetic ZSM-20 zeolite for use herein possesses a definite distinguishing hexagonal crystalline structure whose X-ray diffraction pattern shows substantially the significant lines set forth in Table 1.

TABLE 1

| d(A) | Relative Intensities |
|---|---|
| 14.90 ± 0.3 | VS |
| 14.21 ± 0.3 | VS |
| 8.67 ± 0.2 | M |
| 8.19 ± 0.15 | W |
| 7.44 ± 0.15 | M |
| 5.66 ± 0.10 | S |
| 5.34 ± 0.10 | W |
| 5.17 ± 0.10 | W |
| 5.00 ± 0.10 | W |
| 4.87 ± 0.10 | W |
| 4.74 ± 0.10 | W |
| 4.33 ± 0.09 | M |
| 3.98 ± 0.08 | W |
| 3.83 ± 0.08 | W |
| 3.76 ± 0.08 | M |
| 3.66 ± 0.07 | S |
| 3.60 ± 0.07 | W |
| 3.55 ± 0.07 | W |
| 3.45 ± 0.07 | W |
| 3.33 ± 0.07 | W |
| 3.29 ± 0.07 | M |
| 3.20 ± 0.06 | W |
| 2.90 ± 0.06 | M |
| 2.87 ± 0.06 | W |
| 2.84 ± 0.06 | M |
| 2.79 ± 0.06 | W |
| 2.75 ± 0.06 | W |
| 2.70 ± 0.05 | W |
| 2.61 ± 0.05 | M |
| 2.41 ± 0.05 | W |
| 2.37 ± 0.05 | W |
| 2.17 ± 0.04 | W |
| 2.14 ± 0.04 | W |
| 2.09 ± 0.04 | W |

TABLE 1-continued

| d(A) | Relative Intensities |
|---|---|
| 2.05 ± 0.04 | W |

These values were determined by standard techniques. The radiation was the K-alpha doublet of copper, and a scintillation counter spectrometer with a strip chart pen recorder was used. The peak heights, I, and the position as a function of 2 times theta, where theta is the Bragg angle, were read from the spectrometer chart. From these, the relative intensities, 100 I/Io, where Io is the intensity of the strongest line or peak, and d (obs.), the interplanar spacing in Angstroms (A), corresponding to the recorded lines, were calculated. In Table I, relative intensities are listed according to the following symbol definitions: $VS$ = very strong, $S$ = strong, $M$ = medium and $W$ = weak. It should be understood that this X-ray diffraction partern is characteristic of all the species of ZSM-20 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has previously been subjected to thermal treatment.

While synthetic ZSM-20 zeolites or the thermally treated products thereof may be used herein in a wide variety of hydrocarbon conversion reactions, they are notably useful in the processes of polymerization, aromatization, cracking and hydrocracking. Other hydrocarbon conversion processes for which ZSM-20 or the thermally treated product thereof may be utilized in one or more of its active forms include, for example, alkylation and converting light aliphatics to aromatics such as in U.S. Pat. No. 3,760,024.

Synthetic ZSM-20 zeolites can be used herein either in the tetraethylammonium and alkali metal containing form, the alkali metal form and hydrogen form or another univalent or multivalent cationic form. They can be used in intimate combination with a hydrogenating component such as tungsten, vanadium, molybdenum, rhenium, nickel, cobalt, chromium, manganese, or a noble metal such as platinum or palladium where a hydrogenation — dehydrogenation function is to be performed. Such components can be exchanged into the composition, impregnated therein or physically intimately admixed therewith. Such components can be impregnated into or onto ZSM-20 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

Synthetic ZSM-20, when employed either as an adsorbent or as a catalyst in an organic compound, e.g. hydrocarbon compound, conversion process, should be dehydrated at least partially. This can be done by heating to a temperature in the range of 200° C to 600° C in an inert atmosphere, such as air, nitrogen, etc. and at atmospheric or subatmospheric pressures for between about one and 48 hours. Dehydration can also be performed at lower temperature merely by placing the catalyst in a vacuum, but a longer time is required to obtain a sufficient amount of dehydration.

Zeolite ZSM-20 for use herein can be suitably prepared by preparing a solution containing sources of an alkali metal oxide, preferably sodium oxide, an oxide of tetraethylammonium, an oxide of aluminum, an oxide of silicon and water and having a composition, in terms of mole ratios of oxides, falling within the following ranges:

| | Broad | Preferred |
|---|---|---|
| $\frac{M^+ + R^+}{M^+}$ | 5–10 | 6–7 |
| $H_2O/SiO_2$ | 10–20 | 12–14 |
| $H_2O/OH^-$ | 15–30 | 19–21 |
| $SiO_2/Al_2O_3$ | 30–32 | 30.5–31.5 | wherein R is a tetraethylammonium cation and M is an alkali metal cation, and maintaining the mixture until crystals of the zeolite are formed. Thereafter, the crystals are separated from the liquid and recovered. Typical reaction conditions consist of heating the foregoing reaction mixture to a temperature of from about 50° C for a period of time of from about 1 week to about 7 weeks. A more preferred temperature range is from about 90° C to about 120° C with the amount of time at a temperature in such range being from about 2 weeks to about 1 month.

The digestion of the gel particles is carried out until crystals form. The solid product is separated from the reaction medium, as by cooling the whole to room temperature, filtering and water washing.

The crystalline product is dried, e.g. at 230° F, for from about 8 to 24 hours. Of course, milder conditions may be employed if desired, e.g. room temperature under vacuum.

The composition for the synthesis of synthetic ZSM-20 can be prepared utilizing materials which can supply the appropriate oxide. Such compositions include aluminates, alumina, silicates, silica hydrosol, silica gel, silicic acid and hydroxides.

Crystal size and recrystallization time of the ZSM-20 composition will vary with the nature of the reaction mixture employed.

DESCRIPTION OF SPECIFIC EMBODIMENTS

Synthetic ZSM-20 for use herein can have the original cation associated therewith replaced by a wide variety of other cations according to techniques well known in the art. Typical replacing cations include hydrogen, ammonium, metal cations and mixtures thereof. Of the replacing metallic cations, particular preference is given to cations of metals such as rare earth, Mn, Ca, Mg, Zn, Cd, Pt, Pd, Ni, Co, Ti, Al, Sn, Fe and Co.

Typical ion exchange techniques would include contacting the synthetic ZSM-20 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite for use herein is then preferably washed with water and dried at a temperature ranging from 150° F to about 600° F and thereafter may be calcined in air or other inert gas at temperatures ranging from about 500° F to 1500° F for periods of time ranging from 1 to 48 hours or more to produce a catalytically-active thermal decomposition product thereof (i.e. thermally treated product of the synthetic ZSM-20).

Regardless of the cations replacing the alkali metal in the synthesized form of the ZSM-20, the spatial arrangement of the aluminum, silicon and oxygen atoms which form the basic crystal lattices of ZSM-20 remains essentially unchanged by the described replacement of alkali metal as determined by taking an X-ray powder diffraction pattern of the ion exchanged material.

The ZSM-20 for use herein may be formed in a wide variety of particle sizes. Generally speaking, the particles can be in the form of a powder, a granule, or a molded product, such as extrudate having a particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

As in the case of many catalysts, it may be desired to incorporate the ZSM-20 with another material resistant to the temperatures and other conditions employed in organic compound conversion processes. Such matrix materials include active and inactive materials and synthetic or naturally occurring zeolites as well as inorganic materials such as clays, silica and/or metal oxides, such as alumina. The latter may be either naturally occurring or in the form of gelatinous precipitates, sols or gels including mixtures of silica and metal oxides. Use of a material in conjunction with the ZSM-20, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occuring clays, e.g. bentonite and kaolin. These materials, i.e., clays,oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the synthetic ZSM-20 catalyst include the montmorillonite and kaolin family, which families include the sub-bentonites, and the kaolins commonly known as Dixie, NcNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the ZSM-20 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-20 and inorganic oxide gel matrix vary widely with the crystalline aluminosilicate content ranging from about 1 to about 90 percent by weight and more usually in the range of about 2 to about 70 percent by weight of the composite.

In general, organic compounds may be catalytically converted in the presence of the ZSM-20 catalyst material, including the product of thermal treatment thereof, over a range of catalytic conversion conditions, including a reaction temperature of from about 100° F to about 1200° F, preferably from about 400° F to about 1000° F, a reaction pressure of from atmospheric to about 10,000 psig, preferably from about atmospheric to about 3,500 psig, and a hydrogen/organic compound ratio of from 0 to about 20,000 scf/bbl, preferably from 0 to about 10,000 scf/bbl. When the conversion is conducted in a flow apparatus, e.g. a down-flow reactor, or under conditions comparable to those existing in a flow apparatus, the liquid hourly space velocity (LHSV) should be maintained at between about 0.1 hr$^{-1}$ and about 50 hr$^{-1}$, preferably between about 1 hr$^{-1}$, and about 10 hr. $^{-1}$. When the conversion is conducted in a batch apparatus, e.g. a stirred batch reactor, or under conditions comparable to those existing in a batch apparatus, the contact time should be maintained at between about 0.01 hour and about 48 hours, preferably between about 0.1 hour and about 24 hours.

In particular, when the conversion of organic compound by the present method is olefin polymerization, catalyst conversion conditions should be maintained within certain critical ranges, including a temperature of from about 100° F to about 800° F, preferably from about 400° F to about 600° F, a pressure of from about atmospheric to about 4,000 psig, preferably from about atmospheric to about 2,000 psig, a LHSV (when a flow operation) of from about 0.1 hr$^{-1}$ to about 50 hr$^{-1}$, preferably from about 1 hr$^{-1}$ to about 10 hr$^{-1}$, and a contact time (when a batch operation) of from about 0.1 hour to about 48 hours, preferably from about 0.5 hour to about 24 hours and a hydrogen/hydrocarbon (i.e. olefin) ratio of from about 50 scf/bbl to about 10,000 scf/bbl, preferably from about 500 scf/bbl to about 5,000 scf/bbl.

When the conversion is olefin or paraffin aromatization, catalyst conversion conditions should be maintained within critical ranges, including a temperature of from about 600° F to about 1200° F, preferably from about 800° F to about 1000° F, a pressure of from about 50 psig to about 10,000 psig, preferably from about 100 psig to about 1,000 psig, a LHSV (when a flow operation) of from about 0.1 hr$^{-1}$ to about 10 hr$^{-1}$, preferably from about 1 hr$^{-1}$ to about 5 hr$^{-1}$, a contact time (when a batch operation) of from about 0.1 hour to about 48 hours, preferably from about 1 hour to about 24 hours and a hydrogen/hydrocarbon (i.e. olefin or paraffin) ratio of from about 50 scf/bbl to about 10,000 scf/bbl, preferably from about 100 to about 1,000 scf/bbl.

Further, when the conversion of organic compound by the present method is cracking, catalytic conversion conditions should be maintained within certain critical ranges, including a temperature of from about 700° to about 1200° F, preferably from about 800° F to about 1000° F, a pressure of from about atmospheric to about 200 psig, a LHSV (when a flow operation) of from about 0.5 hr$^{-1}$ to about 50 hr$^{-1}$, preferably from about 1 hr$^{-1}$ to about 10 hr$^{-1}$, and a contact time (when a batch operation) of from about 0.01 hour to about 24 hours, preferably from about 0.1 hour to about 10 hours. When the conversion is hydrocracking, catalyst conversion conditions should be maintained within somewhat different ranges, including a temperature of from about 400° F to about 1000° F, preferably from about 500° F to about 850° F, a pressure of from about 500 psig to about 3500 psig, a LHSV (when a flow operation) of from about 0.1 hr$^{-1}$ to about 10 hr$^{-1}$, preferably from about 0.2 hr$^{-1}$ to about 5 hr$^{-1}$, a contact time (when a batch operation) of from about 0.1 hour to about 10 hours, preferably from about 0.2 hour to about 5 hours and a hydrogen/hydrocarbon ratio of from about 1000 scf/bbl to about 20,000 scf/bbl, preferably from about 3,000 scf/bbl to about 10,000 scf/bbl.

In order to more fully illustrate the nature of the invention and the manner of practicing same, the following examples are presented. These examples are not to be considered limiting, as would be realized by one of ordinary skill in the art.

EXAMPLE 1

Illustrating preparation of synthetic zeolite ZSM-20, a solution comprising 14.1 grams sodium aluminate (43.5 Al$_2$O$_3$, 30.2 Na$_2$O and 24.9% H$_2$O), 764 ml. of 1.51 normal solution of tetraethylammonium hydroxide (prepared from tetraethylammonium bromide) and 6.0 grams of 50 percent NaOH were mixed in a 1 gallon Waring Blender for 1-2 minutes. A 282 gram quantity of tetramethylorthosilicate was then added to the above mixture gradually within about 15 minutes. After addition of the silicate ester was completed, the mixture was stirred for 30 minutes to hydrolyze the ester completely. The slurry formed at this point in time was allowed to stand at room temperature for 3 days, and then placed in 100° C steam chest. Crystallization at 100° C took about 4 weeks. The product crystals were filtered out of solution and water washed until the pH of the wash water was about 8.

X-ray analysis of the crystalline product proved the crystals to have the diffraction pattern as follows:

| 2 Times Theta | Relative Intensities | d(A) |
|---|---|---|
| 5.95 | 88 | 14.85 |
| 6.21 | 100 | 14.23 |
| 7.45 | 46 | 11.87 |
| 8.10 | 29 | 10.92 |
| 10.22 | 21 | 8.66 |
| 10.80 | 20 | 8.19 |
| 11.40 | 7 | 7.66 |
| 11.92 | 34 | 7.42 |
| 15.15 | 6 | 5.85 |
| 15.70 | 71 | 5.64 |
| 16.70 | 26 | 5.31 |
| 17.13 | 9 | 5.18 |
| 17.84 | 10 | 4.97 |
| 18.30 | 21 | 4.85 |
| 18.80 | 24 | 4.72 |
| 19.95 | 5 | 4.43 |
| 20.48 | 35 | 4.34 |
| 21.40 | 16 | 4.15 |
| 22.40 | 63 | 3.97 |
| 23.30 | 19 | 3.82 |
| 23.75 | 44 | 3.75 |
| 24.55 | 5 | 3.63 |
| 24.85 | 5 | 3.58 |
| 25.25 | 5 | 3.53 |
| 25.90 | 9 | 3.44 |
| 26.83 | 19 | 3.32 |
| 27.18 | 39 | 3.28 |
| 27.95 | 5 | 3.19 |
| 28.75 | 5 | 3.11 |
| 29.50 | 8 | 3.03 |
| 29.75 | 5 | 3.00 |
| 30.41 | 3 | 2.94 |
| 30.92 | 27 | 2.89 |
| 31.30 | 10 | 2.86 |
| 31.55 | 35 | 2.84 |
| 32.25 | 11 | 2.78 |
| 32.55 | 5 | 2.75 |
| 33.28 | 24 | 2.69 |
| 34.35 | 24 | 2.61 |
| 37.35 | 6 | 2.41 |
| 38.05 | 15 | 2.37 |
| 40.70 | 1 | 2.22 |
| 41.00 | 1 | 2.20 |
| 41.61 | 7 | 2.17 |
| 42.30 | 6 | 2.14 |
| 43.45 | 11 | 2.08 |
| 44.25 | 8 | 2.05 |
| 47.38 | 4 | 1.92 |
| 48.05 | 4 | 1.89 |
| 48.50 | 1 | 1.88 |
| 49.69 | 5 | 1.84 |
| 50.80 | 4 | 1.797 |
| 52.00 | 6 | 1.759 |
| 52.70 | 10 | 1.737 |
| 54.25 | 10 | 1.691 |
| 56.12 | 3 | 1.639 |
| 57.60 | 3 | 1.600 |
| 58.60 | 11 | 1.575 |
| 59.71 | 2 | 1.549 |

Chemical analysis of the crystalline product led to the following compositional figures:

| Composition | Wt. % | Mole Ratio on Al$_2$O$_3$ Basis |
|---|---|---|
| N | 1.61 | — |
| Na | 3.3 | — |
| Al$_2$O$_3$ | 15.1 | 1.0 |
| SiO$_2$ | 78.1 | 8.8 |
| N$_2$O | — | 0.592 |
| Na$_2$O | — | 0.486 |

After the crystalline product of Example 1 was calcined 12 hours at 1000° F, adsorption tests produced the following results:

| Adsorption | Wt. % |
|---|---|
| Cyclohexane | 20.9 |
| n-Hexane | 20.2 |
| Water | 25.3 |

EXAMPLE 2

Illustrating another preparation of synthetic zeolite ZSM-20, a solution comprising 7.06 grams sodium aluminate (41.8% Al$_2$O$_3$, 31.6% Na$_2$O and 24.9% H$_2$O), 4.0 gms sodium hydroxide (50%), 62 ml. water and 212 grams tetraethylammonium hydroxide (40% solution with water) was mixed in a 1 liter Waring Blender for 2 minutes. A 141 gram quantity of tetramethylorthosilicate was then added to the above mixture gradually within about 15 minutes. Periodically during the silicate ester addition, an aqueous suspension of ZSM-20 "seed" (0.5 grams in 5 ml. water) taken from the product zeolite of Example 1 was added to the contunually blending mixture. After addition of the silicate ester was completed, the mixture was stirred for 30 minutes and then allowed to stand at room temperature for 3 days. It was then placed in a 70°–80° C bath, whereupon crystallization took place in 5 weeks. The product crystals were filtered out of solution and water washed to a pH of about 8.

X-ray analysis of the crystalline product of this example proved the crystals to have the diffraction pattern as follows:

| 2 Times Theta | Relative Intensities | d(A) |
|---|---|---|
| 5.85 | 100 | 15.10 |
| 6.18 | 97 | 14.30 |
| 6.55 | 23 | 13.58 |
| 7.50 | 13 | 11.79 |
| 8.10 | 8 | 10.91 |
| 10.12 | 27 | 8.74 |
| 10.90 | 30 | 8.12 |
| 11.85 | 36 | 7.47 |
| 15.60 | 57 | 5.68 |
| 16.70 | 17 | 5.31 |
| 17.30 | 8 | 5.13 |
| 18.28 | 13 | 4.85 |
| 18.70 | 17 | 4.75 |
| 19.70 | 5 | 4.51 |
| 20.40 | 35 | 4.35 |
| 21.34 | 7 | 4.16 |
| 22.28 | 38 | 3.99 |
| 22.78 | 11 | 3.90 |
| 23.30 | 27 | 3.82 |
| 23.65 | 30 | 3.76 |
| 24.48 | 12 | 3.64 |
| 25.04 | 7 | 3.56 |
| 25.80 | 12 | 3.45 |
| 26.53 | 7 | 3.36 |
| 27.10 | 36 | 3.29 |
| 27.83 | 5 | 3.21 |
| 28.70 | 11 | 3.11 |
| 29.68 | 9 | 3.01 |
| 30.30 | 2 | 2.95 |
| 30.83 | 26 | 2.90 |
| 31.15 | 21 | 2.87 |
| 31.45 | 30 | 2.84 |
| 32.03 | 9 | 2.79 |
| 32.50 | 16 | 2.75 |
| 33.27 | 7 | 2.69 |
| 34.38 | 16 | 2.61 |
| 37.25 | 2 | 2.41 |
| 38.00 | 10 | 2.37 |
| 39.30 | 2 | 2.29 |
| 40.60 | 2 | 2.22 |
| 41.20 | 1 | 2.19 |
| 41.53 | 5 | 2.17 |
| 42.28 | 9 | 2.14 |
| 43.25 | 7 | 2.09 |
| 44.22 | 10 | 2.05 |
| 47.35 | 2 | 1.92 |
| 47.98 | 5 | 1.90 |
| 49.65 | 3 | 1.84 |
| 50.70 | 5 | 1.801 |
| 51.60 | 2 | 1.771 |
| 52.08 | 2 | 1.756 |
| 52.67 | 9 | 1.738 |
| 53.33 | 3 | 1.718 |
| 54.15 | 9 | 1.694 |
| 54.83 | 2 | 1.674 |
| 55.90 | 2 | 1.645 |
| 57.70 | 2 | 1.598 |
| 58.50 | 7 | 1.578 |
| 59.50 | 2 | 1.554 |

Chemical analysis of the crystalline product led to the following compositional figures:

| Composition | Wt. % | Mole Ratio on $Al_2O_3$ Basis |
|---|---|---|
| N | 1.03 | — |
| Na | 5.02 | — |
| $Al_2O_3$ | 16.0 | 1.0 |
| $SiO_2$ | 76.0 | 8.1 |
| $N_2O$ | — | 0.32 |
| $Na_2O$ | — | 0.72 |

After the crystalline product of Example 2 was calcined 18 hours at 1000° F, adsorption tests provided the following results:

| Adsorption | Wt. % |
|---|---|
| Cyclohexane | 21.8 |
| n-Hexane | 19.6 |
| Water | 29.9 |

EXAMPLE 3

The recipe and procedure of Example 1 were followed in this preparation, with the following quantities of components:

| | |
|---|---|
| 7.0 | grams sodium aluminate |
| 4.0 | grams NaOH (50%) |
| 90 | ml. water |
| 212 | grams tetraethylammonium hydroxide (40% solution) |
| 193 | grams tetraethylorthosilicate |

The batch was seeded with zeolite ZSM-20 crystals, which were made in Example 1 in the same manner as in Example 2.

After addition of the silicate ester, the resulting mixture was stirred for 30 minutes and then allowed to stand at room temperature for 24 hours. The mixture was then separated into two parts, part A and part B. Part A was then placed in a 70°–80° C bath, whereupon crystallization took place in 6 weeks. The product crystals were filtered out of solution and water washed to a pH of about 8.

X-ray analysis of the crystalline product of Example 3 proved the crystals to have the diffraction pattern as follows:

| 2 Times Theta | Relative Intensities | d(A) |
|---|---|---|
| 5.92 | 79 | 14.93 |
| 6.23 | 100 | 14.19 |
| 6.63 | 23 | 13.33 |
| 8.20 | 26 | 10.78 |
| 10.11 | 17 | 8.75 |
| 10.90 | 10 | 8.12 |
| 11.85 | 18 | 7.47 |
| 15.10 | 4 | 5.87 |
| 15.60 | 43 | 5.68 |
| 16.55 | 21 | 5.35 |
| 17.20 | 14 | 5.16 |
| 17.77 | 8 | 4.99 |
| 18.17 | 6 | 4.88 |
| 19.63 | 5 | 4.52 |
| 20.37 | 27 | 4.36 |
| 20.85 | 4 | 4.26 |
| 21.33 | 12 | 4.17 |
| 22.28 | 62 | 3.99 |
| 22.75 | 14 | 3.91 |
| 23.20 | 26 | 3.83 |
| 23.60 | 25 | 3.77 |
| 24.30 | 8 | 3.66 |
| 25.00 | 10 | 3.56 |
| 25.73 | 8 | 3.46 |
| 26.55 | 8 | 3.36 |
| 27.05 | 29 | 3.30 |
| 27.80 | 6 | 3.21 |
| 28.60 | 9 | 3.12 |
| 29.25 | 3 | 3.05 |
| 29.60 | 6 | 3.02 |
| 30.35 | 2 | 2.95 |
| 30.80 | 15 | 2.90 |
| 31.10 | 12 | 2.88 |
| 31.40 | 20 | 2.85 |
| 32.10 | 3 | 2.79 |
| 32.50 | 8 | 2.75 |
| 33.10 | 3 | 2.71 |
| 34.28 | 7 | 2.62 |
| 37.20 | 3 | 2.42 |
| 40.58 | 1 | 2.22 |
| 41.15 | 1 | 2.19 |
| 41.45 | 4 | 2.18 |
| 42.30 | 8 | 2.14 |

-continued

| 2 Times Theta | Relative Intensities | d(A) |
|---|---|---|
| 43.27 | 5 | 2.09 |
| 44.12 | 6 | 2.05 |
| 47.25 | 3 | 1.93 |
| 47.90 | 2 | 1.90 |
| 48.45 | 1 | 1.88 |
| 49.50 | 1 | 1.84 |
| 50.60 | 2 | 1.804 |
| 51.75 | 3 | 1.767 |
| 52.50 | 5 | 1.743 |
| 53.48 | 1 | 1.713 |
| 54.03 | 6 | 1.697 |
| 54.90 | 1 | 1.672 |
| 55.95 | 1 | 1.643 |
| 57.50 | 3 | 1.603 |
| 58.38 | 6 | 1.581 |
| 59.45 | 4 | 1.555 |

Chemical analysis of the crystalline product led to the following compositional figures:

| Composition | Wt. % | Mole Ratio on $Al_2O_3$ Basis |
|---|---|---|
| N | 2.71 | — |
| Na | 0.07 | — |
| $Al_2O_3$ | 15.8 | 1.0 |
| $SiO_2$ | 78.8 | 8.4 |
| $N_2O$ | — | 0.85 |

EXAMPLE 4

Part B of the preparation of Example 3 was then placed in a 100° C bath whereupon crystallization took place in 3 weeks. The product crystals were filtered out of solution and water washed to a pH of about 8.

X-ray analysis of the crystalline product of this example proved the crystals to have the diffraction pattern as follows:

| 2 Times Theta | Relative Intensities | d(A) |
|---|---|---|
| 5.85 | 98 | 15.10 |
| 6.15 | 100 | 14.37 |
| 6.50 | 23 | 13.60 |
| 10.15 | 13 | 8.72 |
| 10.95 | 13 | 8.08 |
| 11.87 | 16 | 7.46 |
| 15.62 | 41 | 5.67 |
| 16.70 | 20 | 5.31 |
| 17.45 | 7 | 5.08 |
| 18.20 | 12 | 4.87 |
| 18.72 | 12 | 4.74 |
| 19.75 | 3 | 4.50 |
| 20.40 | 22 | 4.35 |
| 21.33 | 3 | 4.17 |
| 22.30 | 9 | 3.99 |
| 22.67 | 6 | 3.92 |
| 23.25 | 14 | 3.83 |
| 23.65 | 26 | 3.76 |
| 24.42 | 5 | 3.65 |
| 24.97 | 3 | 3.57 |
| 25.82 | 5 | 3.45 |
| 26.63 | 2 | 3.35 |
| 27.13 | 23 | 3.29 |
| 27.88 | 3 | 3.20 |
| 28.70 | 4 | 3.11 |
| 29.70 | 3 | 3.01 |
| 30.40 | 1 | 2.94 |
| 30.86 | 14 | 2.90 |
| 31.20 | 12 | 2.87 |
| 31.48 | 15 | 2.84 |
| 32.08 | 5 | 2.79 |
| 32.50 | 9 | 2.75 |
| 33.25 | 4 | 2.69 |
| 34.35 | 11 | 2.61 |
| 37.19 | 2 | 2.42 |
| 37.79 | 11 | 2.38 |
| 40.65 | 1 | 2.22 |
| 41.03 | 1 | 2.20 |
| 41.50 | 3 | 2.18 |
| 42.03 | 3 | 2.15 |
| 42.40 | 3 | 2.13 |
| 43.20 | 5 | 2.09 |
| 44.15 | 4 | 2.05 |
| 45.85 | 1 | 1.98 |
| 47.30 | 2 | 1.92 |
| 47.90 | 2 | 1.90 |
| 49.59 | 1 | 1.84 |
| 50.65 | 2 | 1.802 |
| 51.80 | 2 | 1.765 |
| 52.60 | 5 | 1.740 |
| 53.30 | 3 | 1.719 |
| 54.12 | 4 | 1.695 |
| 54.80 | 1 | 1.675 |
| 55.90 | 2 | 1.645 |

The product of this example was determined to contain a minor quantity of an impurity identified as zeolite Beta. A part of the product was purified by sedimentation, based on the knowledge that zeolite ZSM-20 crystals are larger and heavier than the crystals of zeolite Beta comprising the impurity.

Chemical analysis of the product crystals, both with and without the impurity, led to the following compositional figures:

| | Wt. % | | Mole Ratio on $Al_2O_3$ Basis | |
|---|---|---|---|---|
| Composition | With Impurity | Without Impurity | With Impurity | Without Impurity |
| N | 1.41 | 1.08 | — | — |
| Na | 3.3 | 4.7 | — | — |
| $Al_2O_3$ | 11.8 | 15.1 | 1.0 | 1.0 |
| $SiO_2$ | 82.2 | 74.5 | 11.8 | 8.4 |
| Ash | 75.4 | 74.6 | — | — |
| $N_2O$ | — | — | 0.585 | 0.35 |
| $Na_2O$ | — | — | 0.621 | 0.69 |

After the purified and impure products of Example 4 were calcined 18 hours at 1000° F, adsorption tests produced the following results:

| | Wt. % | |
|---|---|---|
| Adsorption | Impure | Purified |
| Cyclohexane | 18.3 | 20.1 |

EXAMPLE 5

For this preparation of zeolite ZSM-20, 282 grams of tetramethylorthosilicate and 424 grams of tetraethylammonium hydroxide (40% solution with water) were mixed together in a stainless steel beaker using an electric stirrer. The silicate ester was slowly dripped into the tetraethylammonium hydroxide over a 34 minute time span with the temperature of the mixture varied from 76° F (start) to a high of 110° F (end). The mixture was placed into a one quart plastic jar and then into a steam box to boil off any formed alcohol. The net weight loss during the steaming was 171 grams to a net weight of 481 grams. A 374 gram quantity of sodium aluminate solution containing 14.12 grams sodium aluminate was then mixed into the cooled mixture with agitation at about 55°–60° F. The total mixture was then aged about one day in a 40° F refrigerator and, following aging, was placed in a 100° C steam box whereupon crystallization occurred in about 19 days.

The product crystals were filtered out of solution and washed with water.

X-ray analysis of the crystalline product of this example proved the crystals to have the diffraction pattern as follows:

| 2 Times Theta | Relative Intensities | d(A) |
|---|---|---|
| 5.93 | 81 | 14.90 |
| 6.22 | 100 | 14.21 |
| 10.20 | 21 | 8.67 |
| 10.80 | 15 | 8.19 |
| 11.90 | 31 | 7.44 |
| 15.65 | 58 | 5.66 |
| 16.60 | 17 | 5.34 |
| 17.15 | 6 | 5.17 |
| 17.75 | 8 | 5.00 |
| 18.23 | 10 | 4.87 |
| 18.73 | 12 | 4.74 |
| 19.73 | 3 | 4.50 |
| 20.53 | 32 | 4.33 |
| 21.35 | 1 | 4.16 |
| 22.35 | 4 | 3.98 |
| 23.25 | 28 | 3.83 |
| 23.65 | 41 | 3.76 |
| 24.35 | 3 | 3.66 |
| 24.70 | 2 | 3.60 |
| 25.10 | 2 | 3.55 |
| 25.85 | 7 | 3.45 |
| 26.75 | 4 | 3.33 |
| 27.13 | 35 | 3.29 |
| 27.88 | 4 | 3.20 |
| 28.50 | 1 | 3.13 |
| 29.75 | 4 | 3.00 |
| 30.88 | 23 | 2.90 |
| 31.18 | 16 | 2.87 |
| 31.47 | 26 | 2.84 |
| 32.10 | 8 | 2.79 |
| 32.58 | 15 | 2.75 |
| 33.17 | 6 | 2.70 |
| 34.35 | 24 | 2.61 |
| 37.30 | 3 | 2.41 |
| 38.03 | 11 | 2.37 |
| 40.65 | 2 | 2.22 |
| 41.10 | 2 | 2.20 |
| 41.55 | 5 | 2.17 |
| 42.30 | 9 | 2.14 |
| 43.30 | 7 | 2.09 |
| 44.20 | 8 | 2.05 |
| 45.96 | 1 | 1.97 |
| 47.37 | 3 | 1.92 |
| 47.98 | 3 | 1.90 |
| 48.50 | 1 | 1.88 |
| 49.60 | 2 | 1.84 |
| 50.65 | 5 | 1.802 |
| 51.85 | 5 | 1.763 |
| 52.63 | 10 | 1.739 |
| 53.35 | 5 | 1.717 |
| 54.13 | 8 | 1.694 |
| 54.80 | 1 | 1.675 |
| 56.00 | 3 | 1.642 |
| 57.60 | 3 | 1.600 |
| 58.47 | 8 | 1.578 |
| 59.55 | 2 | 1.552 |

Chemical analysis of the crystalline product led to the following figures:

| Composition | Wt.% |
|---|---|
| $SiO_2$ | 75.0 |
| $Al_2O_3$ | 17.0 |
| Na | 5.3 |
| N | 1.32 |
| C | 9.24 |
| Ash | 78.9 |

After the product crystals of Example 5 were calcined 18 hours at 1000° F, adsorption tests produced the following results:

| Adsorption | Wt.% |
|---|---|
| Cyclohexane | 19.7 |
| n-Hexane | 18.2 |
| Water | 31.6 |

EXAMPLE 6

In this preparation of zeolite ZSM-20, 282 grams of tetramethylorthosilicate was slowly mixed into a 40 percent solution containing 424 grams of tetraethylammonium hydroxide with the temperature of the mixture never exceeding 110° F. The mixture was placed into a one quart plastic jar and the jar was then placed in a steam box for 2 hours at 100° C until bubbling in the mixture stopped. The mixture was then cooled to room temperature and was added to 14.12 grams of sodium aluminate. The total mixture was then aged one day at 100° F. The aged mixture was then placed in a 100° C steam box whereupon crystallization took place in about 30 days. The product crystals were filtered out of solution and water washed to a pH of about 8.

X-ray analysis of the product crystals of Example 6 proved them to have the diffraction pattern as follows:

| 2 Times Theta | Relative Intensities | d(A) |
|---|---|---|
| 5.85 | 100 | 15.10 |
| 6.15 | 96 | 14.37 |
| 7.70 | 3 | 11.48 |
| 10.10 | 16 | 8.76 |
| 10.90 | 15 | 8.12 |
| 11.85 | 22 | 7.47 |
| 14.50 | 2 | 6.11 |
| 15.60 | 59 | 5.68 |
| 16.68 | 24 | 5.32 |
| 17.45 | 9 | 5.08 |
| 18.15 | 19 | 4.89 |
| 18.65 | 17 | 4.76 |
| 19.75 | 4 | 4.50 |
| 20.37 | 24 | 4.36 |
| 21.30 | 3 | 4.17 |
| 22.27 | 17 | 3.99 |
| 22.87 | 13 | 3.89 |
| 23.25 | 18 | 3.83 |
| 23.60 | 32 | 3.77 |
| 24.38 | 10 | 3.65 |
| 25.00 | 4 | 3.56 |
| 25.68 | 7 | 3.47 |
| 26.55 | 6 | 3.36 |
| 27.07 | 32 | 3.29 |
| 27.83 | 6 | 3.21 |
| 28.60 | 7 | 3.12 |
| 29.20 | 4 | 3.06 |
| 29.70 | 6 | 3.01 |
| 30.82 | 26 | 2.90 |
| 31.18 | 15 | 2.87 |
| 31.45 | 23 | 2.84 |
| 32.13 | 7 | 2.79 |
| 32.52 | 11 | 2.75 |
| 33.15 | 6 | 2.70 |
| 34.25 | 19 | 2.62 |
| 37.28 | 2 | 2.41 |
| 37.95 | 7 | 2.37 |
| 40.52 | 2 | 2.23 |
| 41.08 | 1 | 2.20 |
| 41.48 | 5 | 2.18 |
| 42.03 | 4 | 2.15 |
| 42.70 | 4 | 2.12 |
| 43.37 | 4 | 2.09 |
| 44.17 | 6 | 2.05 |
| 45.90 | 1 | 1.98 |
| 46.90 | 1 | 1.94 |
| 47.32 | 2 | 1.92 |
| 47.90 | 3 | 1.90 |
| 49.50 | 2 | 1.84 |
| 50.62 | 4 | 1.803 |
| 51.30 | 2 | 1.781 |
| 51.82 | 3 | 1.764 |
| 52.56 | 6 | 1.741 |
| 53.16 | 5 | 1.723 |

-continued

| 2 Times Theta | Relative Intensities | d(A) |
|---|---|---|
| 54.08 | 9 | 1.696 |
| 55.80 | 3 | 1.647 |
| 57.54 | 3 | 1.602 |
| 58.40 | 8 | 1.580 |
| 59.45 | 4 | 1.555 |

Chemical analysis of the product crystals led to the following figures:

| Composition | Wt. % |
|---|---|
| SiO₂ | 75.5 |
| Al₂O₃ | 15.6 |
| Na | 4.5 |
| N | 1.43 |
| Ash | 82.4 |

After the product crystals of Example 6 were calcined 18 hours at 1000° F, adsorption tests produced the following results:

| Adsorption | Wt. % |
|---|---|
| Cyclohexane | 17.6 |
| n-Hexane | — |
| Water | 26.4 |

EXAMPLE 7

A quantity of zeolite ZSM-20 was prepared as in Example 6, except that aging was done at 40° F prior to crystallization at 100° C.

X-ray analysis of the crystalline product of Example 7 proved it to have the diffraction pattern as follows:

| 2 Times Theta | Relative Intensities | d(A) |
|---|---|---|
| 5.93 | 97 | 14.90 |
| 6.20 | 100 | 14.26 |
| 10.21 | 17 | 8.66 |
| 10.98 | 14 | 8.06 |
| 11.90 | 26 | 7.44 |
| 15.68 | 67 | 5.65 |
| 16.65 | 24 | 5.32 |
| 17.33 | 13 | 5.12 |
| 17.82 | 5 | 4.98 |
| 18.20 | 16 | 4.87 |
| 18.74 | 20 | 4.74 |
| 19.80 | 5 | 4.48 |
| 20.45 | 28 | 4.34 |
| 21.42 | 1 | 4.15 |
| 22.25 | 4 | 3.99 |
| 22.83 | 5 | 3.90 |
| 23.25 | 16 | 3.83 |
| 23.70 | 35 | 3.75 |
| 24.48 | 8 | 3.64 |
| 25.02 | 4 | 3.56 |
| 25.87 | 6 | 3.44 |
| 26.70 | 4 | 3.34 |
| 27.15 | 29 | 3.28 |
| 27.93 | 3 | 3.19 |
| 28.70 | 2 | 3.11 |
| 29.75 | 3 | 3.00 |
| 30.90 | 22 | 2.89 |
| 31.20 | 14 | 2.87 |
| 31.50 | 27 | 2.84 |
| 32.10 | 7 | 2.79 |
| 32.60 | 12 | 2.75 |
| 33.30 | 7 | 2.69 |
| 34.38 | 17 | 2.61 |
| 37.35 | 3 | 2.41 |
| 38.02 | 10 | 2.37 |
| 39.42 | 1 | 2.29 |
| 40.55 | 2 | 2.22 |
| 41.10 | 2 | 2.20 |
| 41.55 | 5 | 2.17 |

-continued

| 2 Times Theta | Relative Intensities | d(A) |
|---|---|---|
| 42.30 | 8 | 2.14 |
| 43.25 | 6 | 2.09 |
| 44.25 | 8 | 2.05 |
| 45.96 | 1 | 1.97 |
| 47.30 | 3 | 1.92 |
| 48.00 | 4 | 1.90 |
| 49.60 | 3 | 1.84 |
| 50.70 | 4 | 1.801 |
| 51.73 | 2 | 1.767 |
| 52.17 | 2 | 1.753 |
| 52.73 | 7 | 1.736 |
| 53.30 | 5 | 1.719 |
| 54.15 | 7 | 1.694 |
| 54.85 | 1 | 1.674 |
| 55.90 | 1 | 1.645 |
| 58.48 | 1 | 1.601 |
| 58.48 | 7 | 1.578 |
| 59.50 | 2 | 1.554 |

Chemical analysis of the product of this example led to the following figures:

| Composition | Wt. % |
|---|---|
| SiO₂ | 75.8 |
| Al₂O₃ | 16.6 |
| Na | 4.7 |
| N | 1.34 |
| Ash | 82.3 |

After the product crystals of Example 7 were calcined at 1000° F for 18 hours adsorption tests indicate the following results:

| Adsorption | Wt. % |
|---|---|
| Water | 28.5 |
| Cyclohexane | 18.7 |

EXAMPLE 8

A 25 gram quantity of the zeolite ZSM-20 product of Example 5 was dried at 120° C for 2 hours and placed in a plastic jar of one pint size. Into this jar was then placed 367 ml. of water (distilled) and 9.5 grams of 50 percent solution of rare earth chloride, the rare earth portion thereof being composed of 61% $La_2O_3$, 12% $CeO_2$, 6% $Pr_6O_{11}$, and 21% $Nd_2O_3$. The solution was then heated at 100° C for ½ hour, vacuum filtered, and water washed using 750 ml. of water. The zeolite was again contacted with rare earth chloride solution (50%), this time 7.0 grams, and water, this time 270 ml. Again the solution formed was heated at 100° C for ½ hour, vacuum filtered and water washed. The zeolite was contacted for a third time as above with 7.0 grams of rare earth chloride solution and 270 ml. of water.

After the third rare earth chloride solution contacting, the zeolite was hot water washed until chloride free, dried at 120° C and calcined at 1100° F for one hour. It was then subjected to an analytical test to determine weight percent solids. The test indicated that the rare earth exchanged zeolite ZSM-20 was composed of 91.8 weight percent solids.

The exchanged zeolite (25 grams) was then mixed with 297 grams of Georgia Kaolin, mulled for 15 minutes dry and 30 minutes with 95 ml. of water added. The mulled mixture was then hydraulically extruded into a ⅛ inch extrudate which was cut into ¼ inch long pieces. The extrudate was then dried at 120° C for 3 hours.

The dried extrudate was then calcined at 1200° F for 2 hours in a nitrogen atmosphere and for 1 hour in air.

The calcined extrudate was then contacted with a solution comprised of 26 grams of $Al_2(SO_4)_3.14H_2O$ and 974 grams of water and then washed with water on a continuous wash line. This contacting and washing was conducted 9 times. The wash each time was conducted until the water was free of $SO_4^=$ ions.

The extrudate was then rare earth post exchanged by contact with 4.0 grams of 50 percent solution of rare earth chloride and 396 grams of water for 6 hours at room temperature. Again the extrudate was water washed until chloride free and dried at 120° C for overnight. The dried exchanged extrudate was chemically analyzed to be composed of 0.22 weight percent sodium, 0.9 weight percent rare earth oxide and 97.3 weight percent ash.

The dried exchanged extrudate was then steam treated for 14 hours at 1290° F and 0 psig with 100% steam. The steamed extrudate was then tested for catalytic activity in the "Cat-D" test, described in U.S. Pat. No. 3,415,736.

The Cat-D test measures activity of a catalyst substance in cracking a Midcontinent gas oil having a boiling point range of 450° F to 950° F and a specific gravity of 0.88 grams/cc. The gas oil is vaporized and preheated to 875° F and then pumped at a rate of 5 cc/minute through a 100cc bed of the catalyst substance maintained at 875° F by external heat. Reactor effluents are condensed and separated into various identifiable components.

The results of the Cat-D test are shown in Table 2.

TABLE 2

| Cat-D Test* of Catalyst Product of Example 8 | | |
|---|---|---|
| | VOL. % | WT % |
| CYCLE ABOVE GASOLINE | 31.52 | 33.67 |
| C₄ FREE GASOLINE | 59.72 | 50.62 |
| TOTAL C₄ | 13.28 | 8.77 |
| DRY GAS | 0.0 | 4.58 |
| COKE | 0.0 | 2.23 |
| HYDROGEN SULFIDE | 0.0 | 0.05 |
| TOTAL OF ABOVE | 104.52 | 99.92 |
| CONVERSION | 68.48 | 66.33 |
| HYDROGEN | 0.0 | 0.05 |
| METHANE | 0.0 | 0.31 |
| ETHENE | 0.0 | 0.29 |
| ETHANE | 0.0 | 0.31 |
| PROPENE | 4.61 | 2.72 |
| PROPANE | 1.57 | 0.90 |
| ISOBUTANE | 6.60 | 4.20 |
| BUTENES | 5.37 | 3.70 |
| N-BUTANE | 1.31 | 0.87 |
| ISOPENTANE | 5.69 | 4.02 |
| PENTENES | 2.63 | 1.95 |
| N-PENTANE | 0.44 | 0.32 |
| C₅ FREE GASOLINE | 50.96 | 44.34 |
| C₄ FREE GASOLINE GRAVITY | | 0.7490 |

*Liquid hourly space velocity maintained at 3.0. Reaction temperature maintained at 875° F. C/O maintained at 2.0.

EXAMPLE 9

Following the Cat-D test of Example 8, the catalyst used therein was submitted to a second steam treatment comprising contacting the catalyst with 100% steam at 100 psig and 1160° F for 10 hours. It was then re-submitted for another Cat-D test, the results of which are as presented in Table 3.

TABLE 3

| Cat-D Test* of Catalyst Product of Example 9 | | |
|---|---|---|
| | VOL % | WT % |
| CYCLE ABOVE GASOLINE | 41.52 | 42.57 |
| C₄ FREE GASOLINE | 52.42 | 44.51 |
| TOTAL C₄ | 11.13 | 7.39 |
| DRY GAS | 0.0 | 3.98 |
| COKE | 0.0 | 1.52 |
| HYDROGEN SULFIDE | 0.0 | 0.0 |
| TOTAL OF ABOVE | 105.07 | 99.97 |
| CONVERSION | 58.48 | 57.43 |
| HYDROGEN | 0.0 | 0.03 |
| METHANE | 0.0 | 0.26 |
| ETHENE | 0.0 | 0.23 |
| ETHANE | 0.0 | 0.27 |
| PROPENE | 4.43 | 2.62 |
| PROPANE | 1.01 | 0.58 |
| ISOBUTANE | 4.85 | 3.09 |
| BUTENES | 5.39 | 3.72 |
| N-BUTANE | 0.89 | 0.59 |
| ISOPENTANE | 3.79 | 2.68 |
| PENTENES | 3.16 | 2.34 |
| N-PENTANE | 0.39 | 0.28 |
| C₅ FREE GASOLINE | 45.07 | 39.21 |
| C₄ FREE GASLINE GRAVITY | | 0.7504 |

*Liquid hourly space velocity maintaned at 3.0 Reaction temperature maintained at 875° F. C/O maintained at 2.0

What is claimed is:

1. A process for effecting catalytic conversion of an organic compound charge which comprises contacting said charge over catalytic conversion conditions with a catalyst comprising a synthetic crystalline aluminosilicate zeolite having a composition expressed in terms of mole ratios of oxides in the anhydrous state as follows:

$$(0.3-0.6)R_2O: (0.4-0.7)M_2O: Al_2O_3: (x)SiO_2$$

wherein R is a tetraethylammonium cation, M is an alkali metal cation and $x$ is at least 7, and having an X-ray powder diffraction pattern which shows the significant lines set forth in Table 1 of the specification or the thermally treated product thereof.

2. The process of claim 1 wherein said catalyst has a composition in terms of mole ratios of oxides in the anhydrous state as follows:

$$(0.3-0.6)R_2O: (0.4-0.7)M_2O: Al_2O_3: (7-10)SiO_2.$$

3. The process of claim 1 wherein M is sodium.
4. The process of claim 2 wherein M is sodium.
5. The process of claim 1 wherein said catalyst has its original cations replaced, at least in part, by ion exchange with a cation or a mixture of cations selected from the group consisting of hydrogen and hydrogen precursors, rare earth metals, aluminum, and metals from Groups IIA, IIIA, IVA, IB, IIB, IIIB, IVB, VIB, and VIII of the Periodic Table of Elements.
6. The process of claim 5 wherein said catalyst has its original cations replaced, at least in part, by ion exchange with hydrogen or hydrogen precursor cations.
7. The process of claim 5 wherein said catalyst has its original cations replaced, at least in part, by ion exchange with rare earth metal cations.
8. The process of claim 1 wherein said catalytic conversion is conducted in a flow apparatus and said conversion conditions include a temperature of from about 100° F to about 1,200° F, a pressure of from about atmospheric to about 10,000 psig, a hydrogen/organic compound ratio of from 0 to about 20,000 scf/bbl and a liquid hourly space velocity of from about 0.1 hr⁻¹ to about 50 hr⁻¹.
9. The process of claim 1 wherein said catalytic conversion is conducted in a batch apparatus and said conversion conditions include a temperature of from about 100° F to about 1,200° F, a pressure of from about atmospheric to about 10,000 psig, a hydrogen-/organic compound ratio of from 0 to about 20,000 scf/bbl and a contact time of from about 0.01 hour to about 48 hours.

10. The process of claim 8 wherein said organic compound is a hydrocarbon compound.

11. The process of claim 9 wherein said organic compound is a hydrocarbon compound.

12. The process of claim 10 wherein said conversion is olefin polymerization and said conversion conditions include a temperature of from about 100° F to about 800° F, a pressure of from about atmospheric to about 4,000 psig, a hydrogen/hydrocarbon ratio of from about 50 scf/bbl to about 10,000 scf/bbl and a liquid hourly space velocity of from about 0.1 hr$^{-1}$ to about 50 hr$^{-1}$.

13. The process of claim 11 wherein said conversion is olefin polymerization and said conversion conditions include a temperature of from about 100° F to about 800° F, a pressure of from about atmospheric to about 4,000 psig, a hydrogen/hydrocarbon ratio of from about 50 scf/bbl to about 10,000 scf/bbl and a contact time of from about 0.1 hour to about 48 hours.

14. The process of claim 10 wherein said conversion is aromatization and said conversion conditions include a temperature of from about 600° F to about 1,200° F, a pressure of from about 50 psig to about 10,000 psig, a hydrogen/hydrocarbon ratio of from about 50 scf/bbl to about 10,000 scf/bbl and a liquid hourly space velocity of from about 0.1 hr$^{-1}$ to about 10 hr$^{-1}$.

15. The process of claim 11 wherein said conversion is aromatization and said conversion conditions include a temperature of from about 600° F to about 1,200° F, a pressure of from about 50 psig to about 10,000 psig, a hydrogen/hydrocarbon ratio of from about 50 scf/bbl to about 10,000 scf/bbl and a contact time of from about 0.1 hour to about 48 hours.

16. The process of claim 10 wherein said conversion is cracking and said conversion conditions include a temperature of from about 700° F to about 1,200° F, a pressure of from about atmospheric to about 200 psig and a liquid hourly space velocity of from about 0.5 hr$^{-1}$ to about 50 hr$^{-1}$.

17. The process of claim 11 wherein said conversion is cracking and said conversion conditions include a temperature of from about 700° F to about 1,200° F, a pressure of from about atmospheric to about 200 psig and a contact time of from about 0.01 hour to about 24 hours.

18. The process of claim 10 wherein said conversion is hydrocracking and said conversion conditions include a temperature of from about 400° F to about 1,000° F, a pressure of from about 500 psig to about 3,500 psig, a hydrogen/hydrocarbon ratio of from about 1,000 scf/bbl to about 20,000 scf/bbl and a liquid hourly space velocity of from about 0.1 hr$^{-1}$ to about 10 hr$^{-1}$.

19. The process of claim 11 wherein said conversion is hydrocracking and said conversion conditions include a temperature of from about 400° F to about 1,000° F, a pressure of from about 500 psig to about 3,500 psig, a hydrogen/hydrocarbon ratio of from about 1,000 scf/bbl to about 20,000 scf/bbl and a contact time of from about 0.1 hour to about 10 hours.

* * * * *

UNITED STATES PATENT AND TRADEMARK OFFICE
CERTIFICATE OF CORRECTION

PATENT NO. : 4,021,331
DATED : May 3, 1977
INVENTOR(S) : JULIUS CIRIC

It is certified that error appears in the above-identified patent and that said Letters Patent are hereby corrected as shown below:

Column 3, line 42    After the word "can" insert the word --also--.

Column 4, line 43    "recrystallization" should read --crystallization--.

Signed and Sealed this second Day of August 1977

[SEAL]

Attest:

RUTH C. MASON
*Attesting Officer*

C. MARSHALL DANN
*Commissioner of Patents and Trademarks*